United States Patent [19]

Klich

[11] 4,143,914

[45] Mar. 13, 1979

[54] SAFETY HARNESS

[76] Inventor: Susanne M. Klich, 1413 Autumn La., Cherry Hill, N.J. 08003

[21] Appl. No.: 755,192

[22] Filed: Dec. 29, 1976

[51] Int. Cl.$^2$ .............................................. A62B 35/00
[52] U.S. Cl. .................................................. 297/389
[58] Field of Search ............... 297/384, 385, 387, 389; 280/747; 2/DIG. 6; 128/134

[56] References Cited

U.S. PATENT DOCUMENTS

| | | | |
|---|---|---|---|
| 2,833,344 | 5/1958 | Lucht | 297/389 |
| 2,908,324 | 10/1959 | Muller et al. | 297/389 |
| 3,099,486 | 7/1963 | Scott | 297/389 |
| 3,154,082 | 10/1964 | Cape | 2/DIG. 2 |
| 3,265,065 | 8/1966 | Jillson | 128/134 |
| 3,279,469 | 10/1966 | Schustack | 2/408 X |
| 3,380,776 | 4/1968 | Dillender | 297/389 |
| 3,407,807 | 10/1968 | Giberson | 128/134 |
| 3,499,681 | 3/1970 | Benitez, Jr. et al. | 297/385 |
| 3,992,040 | 11/1976 | Gannac | 280/747 X |

Primary Examiner—James T. McCall
Attorney, Agent, or Firm—Ralph H. Dougherty

[57] ABSTRACT

A safety harness for a passenger in an automobile in which a light-weight vest is worn by the passenger and is connected to standard seat belts by integrally carried belt means on the vest. The vest is fastened by a Velcro fastener which is adjustable and can optionally have a crotch strap which may be permanently fixed or adjustable by a Velcro fastener or strip. The vest is adapted so that a wearer may recline on a seat and still be protected by the vest which will hold the wearer in a generally reclining position in the event of an emergency.

6 Claims, 3 Drawing Figures

SAFETY HARNESS

BACKGROUND OF THE INVENTION

This invention relates to the safety of automotive passengers and particularly to worn devices for passengers or restraints in the event of a crash or other emergency. Parents of small children in particular have difficulty in putting the presently known harnesses on children, some of which harnesses require connection of numerous buckles and other fastening devices. Most of the restraints for small children do not allow the child to lie down, but require the child to remain in a sitting position. This is extremely tiring on a child, particularly on long trips and at the presently enforced national speed limit of 55 miles per hour which lengthens trips interminably, causing much wear and tear on the nerves of both parent and child.

One of the earliest known vest-type safety harnesses is Cagle U.S. Pat. No. 1,616,349 in which the wearer is positioned in a bib-type harness having six points of connection with the seat. The wearer is held in an upright position and the connection points or fastening devices 2 and 9 constitute danger points to the wearer.

Nunn, et al U.S. Pat. No. 2,758,769 teaches a restraining device which allows a child to stand or perhaps sit. This device has a flexible rod 20 and a pair of arm holder loops 14 which are relatively easy for a child to slip out of. Upon impact of the vehicle, the child will be thrown around the passenger compartment of the car and will be no safer than if he wore no restraining apparatus at all.

Rose et al U.S. Pat. No. 3,529,864 teaches a complex multi-belt device which is slideable up and down to a fixed restraining strap S which strap is connected to the seat back. This device requires the installation of the special strap S and also has the difficulty of being extremely complex, requiring many buckles which render the device difficult to put on and take off. The device also has a number of adjusting features which increase its complexity. Despite the claims for mobility of a wearer of the Rose, et al device, the child is actually held in one place and his mobility is greatly restricted, much more so than in the device of the present invention.

Vaughn et al U.S. Pat No. 3,827,716, teaches a safety vest fastened to the seat back, much in the style of Cagle, which likewise holds the wearer in an upright position.

Muller et al U.S. Pat. No. 2,908,324, teaches a seat vest jacket wich is the closest known prior art to the present invention. Muller, however, teaches a jacket which will not allow the wearer to lie down.

Other patents which may be of interest to the reader are:

Vaccari et al U.S. Pat. Nos. 2,649,236; Boles 2,877,833; Card, 3,275,373; Dillender 3,380,776; Benitez, Jr. et al 3,499,681; and Roberts et al 3,954,280. Some previously known auto restraint harness arrangements for children have the major disadvantage of squeezing the child's body in either the thoracic or pelvic area upon impact of the automobile. The invented vest apparatus covers the child's upper torso, widely distributing impact forces across the torso of the wearer.

OBJECTS OF THE INVENTION

It is the principal object of this invention to provide a safety harness for restraining a child traveling as a passenger in an automobile in the event of an emergency stop or impact of the automobile.

It is also the object of this ivnention of provide an automobile safety harness for a child that will allow the child to travel in either a sitting or a reclining position.

It is another object of this invention to provide a child harness restraint system usable in an automobile equipped with any standard or conventional seat belts.

It is another object of this invention to provide a child harness restraint system with adjustable means so it may accommodate children of different sizes.

It is still another object of this invention to provide a child restraint system from which a child can be readily removed by a rescuer without instructions and without requiring the disengagement of buckles or zippers.

BRIEF DESCRIPTION OF THE DRAWINGS

These and other objects of the inventon are more readily understood by referring to the following detailed specification and the appended drawings in which.

SUMMARY OF THE INVENTION

Figure 1:
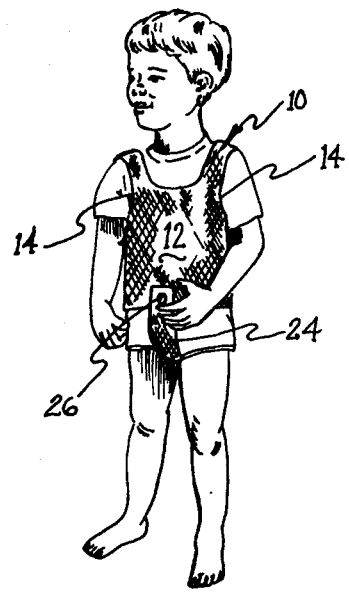
FIG. 1 is a front view of a child wearing the invented harness.
Figure 2:
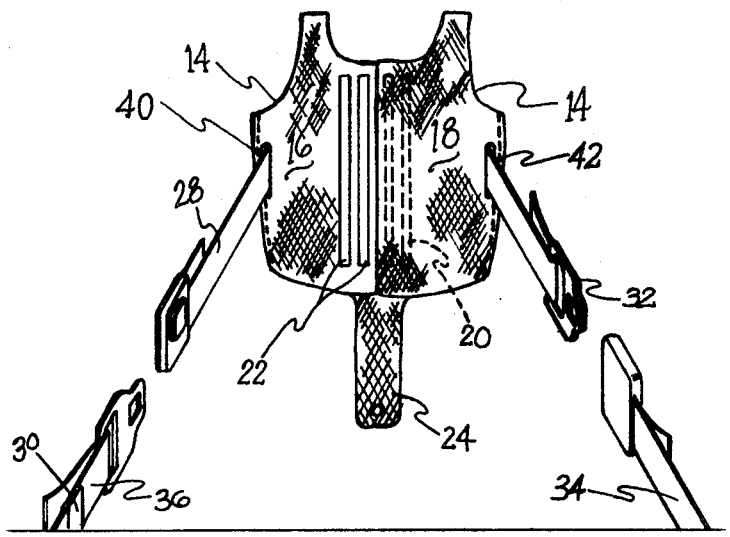
FIG. 2 is a rear view of the invented harness.
Figure 3:
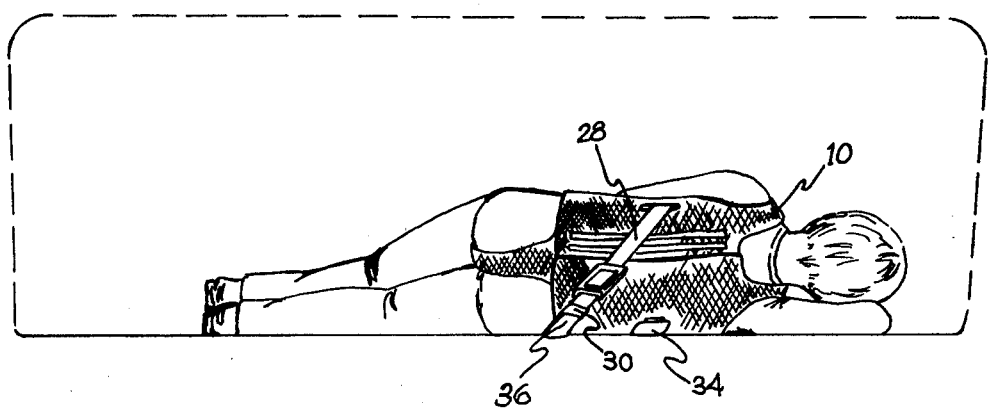
FIG. 3 is a view of an automotive seat from the back showing a child in the invented harness in a reclining position.

In its basic form, the invention comprises a one-piece vest having adjustable fastening means and a pair of anchor straps secured thereto, the straps having means on their opposite ends for fastening to standard automotive seat belts.

The vest optionally has an adjustable crotch strap.

DETAILED DESCRIPTION

Referring now to the drawings, vest 10 has a continuous front 12, armholes 14, and rear section 16 and 18, one of which preferably contains on its inner side as a fastener, a vertically oriented self adherent strip or tape 20. The other of the back portions has on its outer face a plurality of vertically oriented self-adherent fabric ribbon or tapes 22 which have mating hook and pile portions. Suitable fasteners are Velcro tapes. Velcro is a registered trademark of a fabric fastener material manufactured by International Velcro Company and is the subject of two or more patents by George de Mestral under U.S. Pat. Nos. 2,717,437 and 3,009,235.

Preferably at least three such tapes are fastened to the vest to allow adjustment of the vest to various sizes of children and to accommodate the wearer in all seasons of the year, from summer when very few clothes are worn to winter when very heavy and bulky clothing is worn. A crotch strap 24 is integral with the front or the rear of one side piece and is fastened to the opposite rear or front piece of the vest by any suitable fastener such as a snap 26 as shown in FIG. 1. Preferably a series of snaps are provided for adjustability. Alternatively, the crotch fastener may be another vertically oriented Velcro fastener.

Each seat strap 28 passes through and is sewn to the inside of the side of the vest beneath the armholes at about the elevation of the bottom of the wearer's ribcage. Since the strap does not encompass the child, there will be no damage to the area of the abdomen of the child upon impact of the vehicle. The force of restraint will be spread over the entire upper body of the child.

Each strap is provided with a standard device for engagement with a seat belt. Since different seat belt manufactures use different type belt fastening devices, only one is depicted, but it should be understood that this application is intended to encompass all such seat belt fasteners.

In most modern seat belt restraining devices, one belt has an automatic retractor 30. When utilizing the present restraining device, the child is allowed to recline after fastening the belt buckle 32 to the fixed seat belt 34, then the adjustable or retractable seat belt 36 is fastened to the remaining vest belt. This allows the child to lay on one side, but when he sits up, the belt will retract and hold him in an upright position now allowing him to recline until such time as the belt is disengaged and repositioned. If there is no automatic retractor, a small adjustment should be made in the length of the adjustable belt to allow the child to recline.

The vest is preferably made of a nylon mesh fabric or any type of high strength fabric and has side seams 40 and 42 rather than shoulder seams to prevent the child from being thrown upwardly through the fabric. In other words, the fabric will resist bursting from the stress placed on the shoulders. Mesh fabric is preferably employed as the vest material because it is light in weight, allowing the vest to be readily carried in a lady's purse or in the bag of articles which normally accompanies a small child on a trip.

Although the harness or vest has been described with reference to a child, it may optionally be made large enough to be worn by an adult.

It is readily apparent from the foregoing that the present invention provides safety harness for restraining a child in an automobile equipped with standard seat belts, allows the child to sit or recline on the seat of the vehicle during traveling without requiring modification to the apparatus, is adjustable to accommodate wearers of different sizes, and is readily removed from the wearer without requiring the disengagement of buckles or zippers.

It is understood that the above description and drawings are merely illustrative of the invention and that modifications can be made thereto. Accordingly, the invention is to be limited only by the scope of the appended claims.

What is claimed is:

1. A safety vest apparatus for restraining a child in a vehicle equipped with standard automotive seat belts comprising:
    a nylon mesh fabric vest having a front portion, a left rear portion, and a right rear portion, said rear portions being integral with said front portion and thus seam-free in the shoulders;
    armholes between said front and each said rear portion; closure means for detachably fastening said right rear portion to said left rear portion;
    a crotch strap integral with one of said front or rear portions and adjustably fastenable to the other of said rear or front portions of said vest; and
    straps fixed to said front portion at each side of said vest immediately beneath each armhole at the bottom of the ribcage of the wearer and engageable with said automotive seat belts.

2. Apparatus according to claim 1 wherein said crotch strap is fastened to said front portion of said vest by a fabric fastener having mating hook and pile portions.

3. Apparatus according to claim 1 wherein the interior face of one of said rear portions of said vest has a vertical oriented Velcro strip and the exterior face of the other of said rear portions has a vertically oriented Velcro strip engageable with said interior Velcro strip.

4. Apparatus according to claim 3 wherein the exterior face of the other of said rear portions has a plurality of vertically oriented parallel Velcro strips for selective engagement with said interior Velcro strip.

5. Apparatus according to claim 1 wherein said belts are adjustable.

6. Apparatus according to claim 1 further comprising reinforcing means internal to said vest.

* * * * *